US00RE38469E

(19) United States
(12) Reissued Patent
McCrae et al.

(10) Patent Number: US RE38,469 E
(45) Date of Reissued Patent: Mar. 23, 2004

(54) PIGMENTS

(75) Inventors: James McGeachie McCrae, Ayrshire (GB); Eric William Gilmour, Lockwinnoch (GB); Jean-Luc Schwitguebel, Pfeffingen (CH)

(73) Assignee: Ciba Specialty Chemicals Corporation, Tarrytown, NY (US)

(21) Appl. No.: 09/973,612

(22) Filed: Oct. 9, 2001

Related U.S. Patent Documents

Reissue of:
(64) Patent No.: 5,985,019
Issued: Nov. 16, 1999
Appl. No.: 08/735,469
Filed: Oct. 23, 1996

(30) Foreign Application Priority Data

Oct. 25, 1995 (GB) ..... 9521812

(51) Int. Cl.[7] ..... C09B 67/50
(52) U.S. Cl. ..... 106/413; 106/400; 106/401; 106/412; 106/413; 106/493; 106/496; 106/497; 106/498; 106/499
(58) Field of Search ..... 106/400, 401, 106/412, 413, 493, 496, 497, 498, 499

(56) References Cited

U.S. PATENT DOCUMENTS 3,967,922 A * 7/1976 Wolf et al. ..... 8/524
4,179,267 A * 12/1979 Lacroix et al. ..... 8/585
4,527,746 A * 7/1985 Molls et al. ..... 241/23
4,708,719 A * 11/1987 Wilson et al. ..... 8/580
5,173,116 A * 12/1992 Roth ..... 106/401
5,213,583 A * 5/1993 Kaspar et al. ..... 8/526

FOREIGN PATENT DOCUMENTS

| | | |
|---|---|---|
| CA | 1332198 | * 9/1994 |
| EP | 0290108 | * 11/1988 |
| GB | 906973 | * 9/1962 |
| GB | 1134735 | * 11/1968 |
| GB | 2018273 | * 10/1979 |
| GB | 2034735 | * 6/1980 |
| GB | 2135690 | * 9/1984 |
| GB | 2158084 | * 11/1985 |

* cited by examiner

*Primary Examiner*—C. Melissa Koslow
*Assistant Examiner*—Shalie Manlove
(74) *Attorney, Agent, or Firm*—Kevin T. Mansfield; David R. Crichton

(57) ABSTRACT

A process for the manufacture of a pigment concentrate which comprises dispersing dry organic pigment granules in an organic vehicle.

8 Claims, No Drawings

PIGMENTS

Matter enclosed in heavy brackets [ ] appears in the original patent but forms no part of this reissue specification; matter printed in italics indicates the additions made by reissue.

The present invention relates to a process for the production of highly dispersed pigment concentrates which can be used to replace the traditional so called Flush concentrates.

In contrast to the flushing process, the subject of the current invention is a process based on dry, granular feedstock and not on a water-containing pigmented feed-stock, (e.g. presscake) commonly used. The aforementioned concentrates are useful in the colouration of printing inks especially lithographic printing inks.

Methods are known for formulating pigment compositions, which include a carrier to produce a composition which is in a non-powder form. The carriers used in such systems are selected to optimise the incorporation of the pigmented composition produced into the final applicational medium. Conventionally such compositions would be produced from water-containing pigmented feedstocks of 3–40% pigment content, the underlying principle being that an organic pigment has a greater affinity for an oil phase than an aqueous phase and so transfers or flushes from the aqueous environment to the carrier. Pigments have been flushed into a variety of vehicles from the 1860's but it was not until 1914 that pigment flushing as it is commonly known today was invented by Robert Hochstedder. The flush process features and the equipment used have been the subject of much investigation which has resulted in many disclosures of various improvements in the basic concept. However, to date all processes have been based on the use of water-containing pigmented feedstocks, e.g. aqueous press-cakes for reasons described in many publications e.g. Pigment Handbook, Vol 111, (1973) p447–455, Editor T C Patton, Printing Ink Manual, 4th Edition (1989), p602–604, Edited by R H Leach, Printing Ink Technology (1958) p498–502, EA Apps, Industrial Printing Inks (1962), p144–145, L M Larsen J K Randolph European Polymers Paint Colour Journal, Apr. 27, 1994. The basic principle behind the use of, e.g. press-cakes in the flush process to produce high quality dispersions as well as the aforementioned organophilic nature of the pigment is that organic pigments undergo irreversible aggregation/agglomeration during the drying process of manufacture and thus can not effectively flush and so are poorly dispersed, resulting in pigmented concentrates which give undesirable applicational results as described in, e.g. JP Sho 61-23916 (1986), U.S. Pat. No. 4,601,759 (1986), EP 273,236 (1982). As well as processes using press-cakes, more recently, processes have been disclosed whereby the flushing process has been carried out 'in-vat' directly after the completion of synthesis of the pigment and prior to filtration as described in, e.g. WO8912075 (1989), U.S. Pat. No. 4,765,841 (1988), U.S. Pat. No. 4255375 (1981) and EP319,628,B (1987). These processes produce bead-like products which have then been used like the more traditional flushed concentrates as described in some of the above mentioned publications. In the flush procedure these aforementioned publications describe the equipment traditionally used in the flush process as being high energy mixers or kneaders, e.g. Sigma-blade kneaders. During the process the aqueous phase is removed by decantation and further, e.g. press-cake and carrier added whereupon the process repeated until-the desired flush concentrate is achieved. While the use of such flushing techniques avoids certain problems e.g. hydrophilic aggregation on drying, grinding treatment and dusting associated with conventional pigment powder production, flushing processes are not without disadvantages e.g.

1. Standardisation of final coloured concentrate due to the use of non-standardised press-cake.
2. The pigment performance when held in presscake form varies with time and conditions of storage.
3. Energy costs associated with effluent treatment of the discarded aqueous phase which also may contain oils.
4. Energy costs not only for the kneading process but also for the drying of the flush to remove all water.
5. The total cycle times are relatively long to produce the final coloured coating agent e.g. printing ink typically 6–18 hours.
6. The use of agents to promote the flushing process e.g. surfactants.
7. Press-cakes of organic pigments are liable to microbiological attack and though it is possible to add biocides/fungicides, the presence of these are undesirable in lithographic inks.

It is thus surprising that we have found a process which overcomes all these disadvantages and introduces other advantages.

Accordingly the present invention provides a process for the manufacture of a pigment concentrate which comprises dispersing dry organic pigment granules in an organic vehicle.

The key to this invention is the use of dry granular pigment instead of water-containing pigmented feed-stocks (thus avoiding the flush procedure) which do not result in the disadvantages of dry pigment as described herein above, viz very slow rates of dispersion, poor final levels of dispersion and consequently poor quality final inks. Indeed using the same equipment as for flushing, dry granular products as described herein are very rapidly and highly dispersed producing final inks which are at least as good as those derived from a conventional feed-stock. Thus the herein defined dry granular products result in highly dispersed concentrates via processes currently used with water containing pigment compositions, e.g. pigmented press-cakes but with significant advantages over the conventional flush process viz.

1. Like press-cake the granular products are non-dusting but are more easily handled and meterable, making dosing easier and more accurate.
2. Since the granular products are dried during the manufacture then no aqueous waste treatment is required.
3. Processing times are significantly reduced due to the rapid rate of dispersion of the granules.
4. Energy consumption is reduced since the drying step of the flush process is removed.
5. Batch sizes are increased by use of the dry pigmented granules.
6. The granules are standardised prior to use as part of their manufacturing process.
7. Since press-cakes of organic pigments are liable to biological attack resulting in deterioration of applicational performance in terms of colouristics then this is overcome by the use of the dry standardised granules.
8. No flush enhancing additives are required.
9. Conventional equipment is used as for press-cakes.

In particular as well as significantly reduced processing costs the machine time, i.e. cycle time is between 14 hrs but normally between 1–2 hrs depending on the pigment used compared to the 5–16 hours cycle time using the traditional flush process.

The pigment granules used in this process are based on conventional organic pigments including azo, azomethene, copper phthalocyanines, anthraquinones, nitro, perinone, quinacridone, azo or azomethene metal salts or complexes and dipyrolopyrole. Mixtures of pigments may also be used. The pigment, used in this process may or may not be surface treated e.g. using treatments normally applied to pigments for use in oil ink systems. The treatments may comprise additives which are natural or synthetic resins which may be in non-salt form or in salt form.

Examples of such resins include rosin, the principal component of which is abeitic acid; also modified rosin such as hydrogenated, dehydrogenated or disproportionated rosin, dimersed or polymerised rosin, partially esterified rosin, non-esterified or partially esterfied maleic or phenolic modified rosin. Illustrative rosins include such commercially available materials as Staybelite resin (hydrogenated rosin), Recoldis A resin (disproportionated rosin) and Dymerex resin (dimersed rosin). The additive may also be an amine, e.g. rosin amine D (dehydroabietyl amine).

As part of this water-soluble salt additive it is also optional that a non-polar component be present as described in our patent U.S. Pat. No. 5,366,546.

Non-polar components, which may be added to the polar pigment additive may be, but are not limited to, rosin-modified phenolic resins, rosin-modified maleic resins, hydrocarbon resins, alkyd resins, phenolic resins, fatty alcohols, drying, semi-drying or non-drying oils, polyolefins, waxes, litho varnishes, or gloss varnishes.

The dry granular pigment used in the present invention is a low dusting meterable material with a mean size of 0.1 to 50 mm but more preferably 0.1–20 mm. Also the term dry is understood to refer to 05.0% moisture but more normally 02.0% residual moisture. The granules herein disclosed are conveniently prepared by a range of known methods and include as examples wet granulation using a extruder granulator followed by conventional drying of the granular extrudate, as described in Japanese laid open patent 52568/1983 spray drying as described in U.S. Pat. No. 3,843,380, in-vat granulation as described in U.S. Pat. No. 4,255,375 or fluid-bed granulation as described for example in GB2036057.

The carrier vehicles into which to pigment granules are dispersed are usually hydrophobic, are dependant upon the final application area and include but are not restricted to the following viz, printing ink varnishes including those used in heatset, cold set and sheetfed inks, lithographic inks, news inks, varnish tin printing inks, thermoplastic resins and waxes, such as high density polyethylene, low density polyethylene, polyethylene waxes and polypropylene plastics.

The process of manufacture of the dispersed pigment concentrates of the invention may use equipment currently used by manufacturers of coloured concentrates based on water containing pigmented feed-stocks, i.e. flush, and includes for example kneaders, extruders, high energy mixers but preferably kneaders of the Z-blade type.

The dispersed pigment concentrates so produced by this process have a pigment concentration ranging from 20–75% but preferably from 30–60%. The process of manufacture for example using conventional kneaders e.g. of the Z-blade type is most conveniently but not exclusively carried out by adding the appropriate amount of carrier, for example a printing ink varnish, mixing said varnish in the mixer, then metering in the appropriate quantity of granules over a period of 1–20 mins but more normally 2–5 minutes to produce a pulp of 40–80% pigment concentration but more ideally 50–65%. The granules rapidly wet out and are dispersed after 5–45 minutes but more often over 5–30 minutes. The resulting fully dispersed viscous pulp is then diluted by careful addition of carrier vehicle e.g. ink varnish and if required any other desired additives to the required pigmentation level of the final concentrate. The concentrate is then discharged for use in the appropriate application at the required pigmentation level.

The final inks produced by to above process are at least equivalent in quality to those produced via the traditional flush process.

The invention is illustrated by to following Examples.

EXAMPLE 1

Part A.

A resinated Pigment Yellow 12 product, in presscake form with a solids content of 35%, is prepared. This presscake is extruded through a roller granulator to produce spaghetti like granules (diameter 6 mm). These are then dried in an oven at 70° C. The bulk of the resultant granular material has a diameter of 5–6 mm and lengths distributed between 0.5 and 3.0 cm.

Part B.

To a Twin Bladed Z-Blade Kneader of total chamber volume 2 liters is added 120 grammes of a Heatset Ink Varnish. The blades are then rotated at 30 and 55 rpm and 300 grammes of the granules from A are added. The mixture is then kneaded at the aforementioned blade speeds for 15 mins. To avoid overheating, cold water is passed through a cooling jacket. After 10–15 minutes a viscous glossy mass is formed. Over a period of 1 hour a further addition of 330 grammes of varnish is made to produce a pasty mass containing 60% Heatset Ink Varnish and 40% pigment product.

Part C.

52.5 grammes of the concentrate produced in B. is used to prepare a finished Heatset Ink, containing 15% of the original granular product. This ink is evaluated against a conventional fine powder version of the same PY 12 product prepared as a 15% ink on a Triple Roll Mill, using the same varnish system.

EXAMPLES 2 to 8

The following examples, Table 1: Examples 2–8, are produced in the manner described in Example 1.

TABLE 1

| Example | Pigment | % Resin | Varnish | Initial % Product | Final % Product | Total Process Time |
|---|---|---|---|---|---|---|
| 2. | Pigment Red 57.1 | 21% | Heatset | 50% | 20% | 2 hrs |
| 3. | Pigment Yellow 12 | 0% | Heatset | 60% | 21% | 1 hr 30 mins |

TABLE 1-continued

| Example | Pigment | % Resin | Varnish | Initial % Product | Final % Product | Total Process Time |
|---|---|---|---|---|---|---|
| 4. | Pigment Yellow 12 | 40% | Heatset | 60% | 21% | 2 hrs 30 mins |
| 5. | Pigment Yellow 13 | 32% | Heatset | 60% | 40% | 1 hr |
| 6. | Pigment Blue 15.3 | 10% | Heatset | 50% | 40% | 1 hr |
| 7. | Pigment Yellow 174 | 32% | Heatset | 50% | 40% | 1 hr |
| 8. | Pigment Red 57.1 | 21% | Heatset | 50% | 40% | 1 hr |

EXAMPLE 9

Part A.

A resinated Pigment Yellow 174 product, in presscake form with a solids content of 35%, is prepared. This presscake is extruded through a roller granulator to produce spaghetti like granules (diameter 6 mm). These are then dried in an oven at 70° C. The bulk of the resultant granular material has a diameter of 5–6 mm and lengths distributed between 0.5 and 3.0 cm.

Part B.

To a Twin Bladed Extruder Z-blade kneader of total chamber volume 26 liters is added 7.2 kilogrammes of a Heatset Ink Varnish Component. The blades are then rotated at 35 and 56 rpm and the extruder, in the base of the mixer pan, rotated in a reverse direction to push material back into the mass. 4.8 kilogrammes of the granules from A are then added to the mass. The mixture is kneaded at the aforementioned blade speeds for 60 minutes. To avoid overheating, cold water is passed through a cooling jacket. After 60 minutes the extruder direction is reversed to extrude the mass through a 10 mm die plate. This produces a cylindrical extrudate containing 60% Ink Varnish Component and 40% pigment product.

Part C.

37.5 grammes of the concentrate produced in B. is used to prepare a finished Heatset Ink, containing 15% of the original granular pigment product. This ink is evaluated against a conventional fine powder version of the same PY 174 product; prepared as a 15% ink on a Triple Roll Mill, using the same varnish system.

The concentrate produced in B is also reduced to final inks using various methods, such as Triple Roll Mill or Beadmill.

EXAMPLES 10 to 12

The examples listed in Table 2, are produced and completed in a similar manner to Example 9.

TABLE 2

| Example | Pigment | % Resin | Varnish | Initial % Product | Final % Product | Total Process Time |
|---|---|---|---|---|---|---|
| 10. | Pigment Yellow 174 | 32% | Heatset | 50% | 50% | 1 hr 30 mins |
| 11. | Pigment Yellow 174 | 32% | Heatset | 40% | 40% | 1 hr 30 mins |
| 12. | Pigment Yellow 174 | 32% | Heatset | 60% | 50% | 1 hr 30 mins |

EXAMPLE 13

Using a Z-blade mixer the following Table 3 clearly illustrates the cost benefits of the invention when compared to the equivalent flush process based on traditional presscake feed-stock containing 40–50% moisture.

TABLE 3

| FEEDSTOCK | PROCESS TIME (hr) | LABOUR (man-hr) | ELECTRIC POWER (Kwhr) | STEAM UTILISATION (Tonnes) |
|---|---|---|---|---|
| Pigment Rubine 57.1 presscake | 10 | 10 | 255 | 2.7 |
| Pigment Rubine 57.1 granules | 1.5 | 1.0 | 70 | 0 |
| Pigment Yellow 12 presscake | 5.5 | 5.5 | 140 | 2.7 |
| Pigment Yellow 12 granules | 2.0 | 1.0 | 70 | 0 |
| Pigment Blue 53.1 presscake | 8.0 | 8.0 | 205 | 1.8 |
| Pigment Blue 53.1 granules | 2.0 | 1.0 | 70 | 0 |

It can dearly be seen from the above table the significantly improved economics of manufacture of coloured concentrates based on dry, granular feed-stocks as compared to the traditional flush route.

EXAMPLE 14

Following the procedure of Example 9, Part C, Inks are made from the Pigment Rubine 57.1 concentrates of Example 13. The quality of the resulting inks is shown in Table 4, using the ink originating from a presscake flush as the standard.

TABLE 4

| FEEDSTOCK | LEVEL OF DISPERSION | GLOSS | STRENGTH | TRANS-PARENCY |
|---|---|---|---|---|
| Flush conc based on presscake | Std | Std | Std | Std |
| Conc based on dry granules | superior | superior | equivalent | equivalent |

EXAMPLE 15

Part A

To a Twin bladed Z-blade kneader of total chamber volume 3 liters is added 300 gm of a heat-set ink varnish followed by 300 gm of a granular Pigment Rubine 57.1 product comprising 83% Pigment Rubine 57.1 and 17% of a modified abietic acid resin. The kneader is started at a slow rate (blade speeds 16 and 8 rpm) to fold in the pigment granules into the varnish. After 5 minutes the speeds are increased to 32 and 18 rpm and after a further 8 minutes increased slowly to 56 and 30 rpm. The mix is kneaded for a further 30 minutes. Further varnish is then added over 15 minutes to reduce concentration to 40% and kneaded for a further 15 minutes.

Total processing time: 90 minutes.

Part B

A 15% Heat-set ink prepared from the above 40% concentrate on a Triple Roll Mill shows similar colouristic properties and dispersion level to a conventional powder ink prepared using the same Rubine 57.1 product. Also an ink based on a conventional flush shows applicational properties equivalent to the ink from the 40% concentrate of Part A.

Examples 16–22 are produced in the manner described in Example 9.

TABLE 2

| Example | Pigment | % Resin | Varnish | Initial % Product | Final % Product | Total Process Time |
|---|---|---|---|---|---|---|
| 16 | Blue 15.3 | 10 | Heat-set | 50 | 40 | 1 hr 45 mins |
| 17 | Yellow 188 | 40 | Heat-set | 60 | 40 | 1 hr 45 mins |
| 18 | Yellow 12 | 40 | Sheet-fed | 56 | 40 | 40 mins |
| 19 | Yellow 13 | 32 | Sheet-fed | 55 | 40 | 1 hr 10 mins |
| 20 | Yellow 12 | 40 | Sheet-fed | 60 | 30 | 1 hr 10 mins |
| 21 | Red 67.1 | 20 | Web-offset | 55 | 35 | 1 hr 10 mins |
| 22 | Blue 15.3 | 10 | Web-offset | 55 | 40 | 1 hr 30 mins |

EXAMPLE 17–23

To a Z-blade kneader of nominal capacity 2 liters is added 200 g of a heat-set ink varnish followed by 260 g of a granular Pigment Yellow 12 product comprising 60% chromophore and 40% modified abietic acid resin and having a mean particle size distribution greater than 3 mm. The kneader is started at a slow rate to fold in the pigment. After 5 minutes the speed is slowly increased to maximum and kneading commenced (10 minutes). Kneading continues for a further 30 minutes to ensure full dispersion and homogeneity.

Total passing time: 40 Minutes

EXAMPLE 24

To a Z-blade kneader of nominal capacity 2 liters is added 200 g of a heat-set ink varnish followed by 260 g of a granular Pigment Yellow 12 product comprising 60% chromophore and 40% modified abietic acid resin and having a mean particle size distribution greater than 1 mm but less than 3 mm. The kneader is started at a slow rate to fold in the pigment. After 5 minutes the speed is slowly increased to maximum and kneading commenced (10 minutes). Kneading continues for a further 40 minutes to ensure full dispersion and homogeneity.

Total processing time: 50 Minutes

EXAMPLE 25

To a Z-blade kneader of nominal capacity 2 liters is added 200 g of a heat-set ink varnish followed by 260 g of a granular Pigment Yellow 12 product comprising 60% chromophore and 40% modified abietic acid resin and having a mean particle size distribution greater than 100 micron but less than 1 mm. The kneader is started at a slow rate to fold in the pigment. After 5 minutes the speed is slowly increased to maximum and kneading commences (10 minutes). Kneading continues for a further 45 minutes to ensure full dispersion and homogeneity.

Total processing time: 55 Minutes

EXAMPLE 26

To a Z-blade kneader of nominal capacity 2 liters is added 200 g of a heat-set ink varnish followed by 260 g of a granular Pigment Yellow 12 product comprising 60% chromophore and 40% modified abietic acid resin and having a mean particle size distribution less than 100 micron. The kneader is started at a slow rate to fold in the pigment. After 10 minutes the speed is slowly increased to maximum and kneading commences (20 minutes). Kneading continues for a further 40 minutes to ensure full dispersion and homogeneity.

Total processing time: 70 Minutes

EXAMPLE 27

The 54.55% concentrates produced in Examples 17–20 are reduced to 15% inks by mixing on a Three Roll Mill. When compared with a conventional powder ink produced from the same product, Examples 23 and 24 show improved applicational properties with Examples 25 and 26 showing similar properties.

EXAMPLE 28

Example 15 is repeated using a kneader which is single speed. Half of the granules are charged to a kneader containing full varnish charge and processed as in Example 15. After approximately 10 minutes the machine is stopped and the remaining granules are added and the process repeated.

EXAMPLE 29

Part A 350 gm of a granular Pigment Yellow 13 product comprising 68% Pigment Yellow 13 and 32% of a modified abietic resin is charged with 650 gms of a low density polyethylene resin to a high speed mixer having a nominal chamber volume of 10 liters. The mixer is run for 10 minutes at 2500 rpm. The resulting mix is discharged to the hopper of a extruder or other suitable dispersing machinery and a masterbatch concentrate is so produced.

Part B

1% of the concentrate produced in Part A is mixed with 99% of a low density polypropylene resin and extended through a conventional injection moulder to produce a coloured mould. The quality of the mould is similar to that produced with conventional powder feed-stocks in the same application.

EXAMPLE 30

Part A

To a twin screw extruder rotating at 300 rpm 5 Kgs of granules described in Part A in Example 9 is continuously fed simultaneously with 3.35 Kgs of Heat set ink component (1) followed by 3.25 Kgs of ink component (2) at a second charge port of the extruder. The extruder is cooled to avoid overheating by circulating cold water in a cooling jacket. At the discharge end of the extruder a cylindical extrudate is formed containing 57% ink varnish component and 43% pigment product.

Part B 37.5 grams of the concentrate produced in A is used to prepare a finished heat-set ink, containing 15% of the original pigment product. The ink is evaluated against a conventional fine powder version of the same PY174, prepared as a 15% ink on a Triple Roll Mill using same varnish system.

We claim:

1. A process for the preparation of a pigment concentrate [which comprises] *comprising*

*a*) [dispersing] *producing* dried organic pigment granulates [obtained] by

*1*) wet granulation [in an ink varnish] using an extruder granulator followed by drying of the granular extrudate,

*2*) spray drying,

*3*) in-vat granulation or

*4*) fluid-bed granulation,

*b*) [wherein said dispersion is carried out] *dispersing said dried organic pigment granulates* in *an ink varnish, using* a kneader, a kneader/extruder or an extruder.

2. A process as claimed in claim 1 in which the dry pigment granules contain 0–5% moisture.

3. A process as claimed in claim 1 in which the dry granules have a mean size of 0.1 to 50 mm.

4. A process as claimed in claim 1 in which the pigment is an azo, azomethene, copper phthalocyanine, anthraquinone, nitro, perinone, quinacridone, azo or azomethine metal salt or complex or dipyrolopyrole pigment, or mixtures thereof.

5. A process as claimed in claim 1 in which the pigment is resinated with a natural or synthetic resin.

6. A process as claimed in claim 1 in which the pigment granules also contain a non-polar component.

7. A dispersed pigment concentrate which is produced by a process as claimed to claim 1.

8. A concentrate as claimed in claim 7 which contains from 40 to 80% of pigment.

* * * * *